US011403076B2

(12) United States Patent
Cerar et al.

(10) Patent No.: US 11,403,076 B2
(45) Date of Patent: Aug. 2, 2022

(54) FUNCTIONAL AND CODE VIEWS IN A PROCESS WORKFLOW

(71) Applicant: Shopify Inc., Ottawa (CA)

(72) Inventors: Katherine L. Cerar, Kitchener (CA); Phillip James McClelland, Waterloo (CA); Nicholas Mulder, Waterloo (CA); Alexander Blaise, Kitchener (CA); Jeffery A. Bertrand, Waterloo (CA); Joseph Lomanto, Dundas (CA); Thiago Tonelli Bartolomei, Waterloo (CA); Jack P. D. Read, Guelph (CA); Dustin John Malik, Waterloo (CA); Stanislav Korsei, Vancouver (CA); Michael E. Rybka, Bolton (CA); Praneethi Komatreddy, Brampton (CA); Saad Bin Asif, Waterloo (CA)

(73) Assignee: Shopify Inc., Ottawa (CA)

( * ) Notice: Subject to any disclaimer, the term of this patent is extended or adjusted under 35 U.S.C. 154(b) by 72 days.

(21) Appl. No.: 16/930,084

(22) Filed: Jul. 15, 2020

(65) Prior Publication Data
US 2020/0348913 A1    Nov. 5, 2020

Related U.S. Application Data

(63) Continuation of application No. 16/205,967, filed on Nov. 30, 2018, now Pat. No. 10,754,626.

(51) Int. Cl.
*G06F 8/35* (2018.01)
*G06F 8/34* (2018.01)
(Continued)

(52) U.S. Cl.
CPC .................. *G06F 8/35* (2013.01); *G06F 8/20* (2013.01); *G06F 8/34* (2013.01); *G06F 8/38* (2013.01); *G06F 8/75* (2013.01)

(58) Field of Classification Search
None
See application file for complete search history.

(56) References Cited

U.S. PATENT DOCUMENTS

| 6,055,369 A | 4/2000 | Sawahata et al. |
| 6,225,998 B1 | 5/2001 | Okita et al. |
| (Continued) | | |

OTHER PUBLICATIONS

"Graphical user interface (computing)", https://www.britannica.com/technology/graphical-user-interfac, Encyclopedia Britannica, last retrieved from   on Oct. 15, 2019, published Mar. 29, 2018, 3 pages.

(Continued)

*Primary Examiner* — Andrew M. Lyons
(74) *Attorney, Agent, or Firm* — GTC Law Group PC & Affiliates

(57) ABSTRACT

In embodiments of the present invention improved capabilities are described for modifying the display of a workflow component from including a depiction of a first representation level to a depiction of a second representation level, wherein one of the depiction at the first representation level and the depiction at the second representation level includes a depiction of the functionality associated with the workflow component and the other of the depiction at the first representation level and the depiction at the second representation level includes a view of programming code for providing the functionality associated with the workflow component.

23 Claims, 15 Drawing Sheets

(51) Int. Cl.
*G06F 8/75* (2018.01)
*G06F 8/38* (2018.01)
*G06F 8/20* (2018.01)

(56) References Cited

U.S. PATENT DOCUMENTS

| | | | |
|---|---|---|---|
| 6,243,092 | B1 | 6/2001 | Okita et al. |
| 9,348,563 | B1 | 5/2016 | Xue et al. |
| 10,114,618 | B2 | 10/2018 | Wee et al. |
| 10,223,076 | B1 | 3/2019 | Owen et al. |
| 2002/0007483 | A1 | 1/2002 | Lopez |
| 2003/0167455 | A1 | 9/2003 | Iborra et al. |
| 2004/0148586 | A1 | 7/2004 | Gilboa |
| 2005/0066304 | A1 | 3/2005 | Tattrie et al. |
| 2005/0229154 | A1 | 10/2005 | Hiew et al. |
| 2005/0240863 | A1 | 10/2005 | Olander et al. |
| 2006/0074735 | A1 | 4/2006 | Shukla et al. |
| 2006/0080592 | A1 | 4/2006 | Alves et al. |
| 2007/0079285 | A1 | 4/2007 | Cook et al. |
| 2007/0079286 | A1 | 4/2007 | Cook et al. |
| 2007/0266368 | A1 | 11/2007 | Szpak et al. |
| 2007/0276689 | A1 | 11/2007 | Slone et al. |
| 2008/0028366 | A1 | 1/2008 | Weng et al. |
| 2008/0040173 | A1 | 2/2008 | Aleong et al. |
| 2010/0050153 | A1 | 2/2010 | Louie et al. |
| 2010/0241990 | A1 | 9/2010 | Gabriel et al. |
| 2010/0251155 | A1 | 9/2010 | Shah et al. |
| 2011/0161924 | A1 | 6/2011 | Alexander et al. |
| 2012/0089959 | A1 | 4/2012 | Park |
| 2012/0192151 | A1 | 7/2012 | Parkes et al. |
| 2013/0086551 | A1 | 4/2013 | Archer et al. |
| 2013/0179860 | A1 | 7/2013 | Woock |
| 2014/0109043 | A1 | 4/2014 | Bolotnikoff et al. |
| 2014/0278312 | A1 | 9/2014 | Nixon et al. |
| 2015/0220311 | A1 | 8/2015 | Salter |
| 2015/0363175 | A1 | 12/2015 | Klausner |
| 2016/0342396 | A1* | 11/2016 | Kukolich ........... G06F 8/41 |
| 2017/0147296 | A1 | 5/2017 | Kumar et al. |
| 2017/0160880 | A1 | 6/2017 | Jose et al. |
| 2017/0168784 | A1 | 6/2017 | Hwang et al. |
| 2017/0199727 | A1* | 7/2017 | Lau ................... G06F 8/35 |
| 2017/0315789 | A1 | 11/2017 | Lam et al. |
| 2017/0316355 | A1 | 11/2017 | Shrestha et al. |
| 2017/0316363 | A1 | 11/2017 | Siciliano et al. |
| 2018/0107461 | A1 | 4/2018 | Balasubramanian et al. |
| 2018/0189033 | A1 | 7/2018 | Narang et al. |
| 2018/0189035 | A1 | 7/2018 | Narang et al. |
| 2018/0232216 | A1 | 8/2018 | White et al. |
| 2018/0285476 | A1 | 10/2018 | Siciliano et al. |
| 2019/0005228 | A1 | 1/2019 | Singh et al. |
| 2019/0163793 | A1 | 5/2019 | Buehler et al. |
| 2019/0227793 | A1* | 7/2019 | Ramasamy ...... G06Q 10/06398 |
| 2019/0272154 | A1 | 9/2019 | Chaudhry et al. |
| 2020/0174756 | A1 | 6/2020 | Cerar et al. |

OTHER PUBLICATIONS

Borgo, et al., "An Empirical Study on Using Visual Embellishments in Visualization", IEEE Transactions on Visualization and Computer Graphics, vol. 18, No. 12,, Dec. 2012, pp. 2759-2768.

Hlawatsh, et al., "Visualizing the Evolution of Module Workflows", 2015 19th International Conference on Information Visualisation, Barcelona, Spain, 2015, pp. 40-49.

Maheshwari, et al., "Scientific Workflow Development Using Both Visual and Script-Based Representation", 2010 IEEE 6th World Congress on Services, Miami, FL, 2010, pp. 328-335.

* cited by examiner

FIG. 3

< Workflows
Hold and tag high-risks
More actions

Work flow summary
- When order risk analyzed.
  - If order / riskLevel is equal to enum / OrderRiskLevel / HIGH
    - # Send Slack message
      Have a look at https://flow-test
    - ⊕ Add customer tags
      Previous-risky-order
  - OTHERWISE
    - ⊕ Capture payment Edit workflow ⊘ Workflow off ◯
Turn on this workflow to start monitoring new events.

Recent activity
Last flow run    Last action run    Last 7 days
-                -                  0 actions
                                    from 0 triggers Recent results
This workflow hasn't been triggered recently.

⌂ Home
→ Orders (447)
◇ Products
○ Customers
⫽ Analytics
⊕ Discounts
⊞ Apps
SALES CHANNELS ⊕
⊞ Online Store ◆
⊞ Wholesale
⊗ Tapcart - Mobile App ⚙ Settings
↗ Open in services/internal
⊙ Logged in

```
v1:57de25b742a2a3f6e348a40e83c3d55f05b75a0065f927013c232eeaa1f542fa:{
    "cases":[
        {
            "condition":{
                "op":" u0026",
                "args":[
                    {
                        "op":"==",
                        "args":[
                            {
                                "field":"riskLevel",
                                "on":{
                                    "var":"order"
                                }
                            },
                            {
                                "field":"HIGH",
                                "on":{
                                    "field":"OrderRiskLevel",
                                    "on":{
                                        "var":"enum"
                                    }
                                }
                            }
                        ]
                    }
                ]
            }
            "actions":[
                {
                    "id":"11739cff-2243-4bc3-a0ef-f0c5b3e46a7c",
                    "action":"slack",
                    "properties":{
                        "to":"#risk-management",
                        "message":"Have a look at https://example.myshop    .com/admin/orders/{{order.id}}"
                    }
                },
                {
                    "id":"5d84c124-db57-4126-8577-d3c09f7e44d4",
                    "action":"add_customer_with_order_tags",
                    "properties":{
                        "tags":"previous-risky-order"
                    }
                }
            ]
        },
        {
            "condition":true,
            "actions":[
                {
                    "id":"7a55ffa8-ab88-411d-8a82-d8a9a2f7122d",
                    "action":"capture_payment",
                    "properties":{

}
                }
            ]
        }
    ],
    "title":"Hold and tag high-risks",
    "trigger":"order_risk_analyzed"
```

FIG. 11A

FUNCTIONAL AND CODE VIEWS IN A PROCESS WORKFLOW

CROSS-REFERENCE TO RELATED APPLICATIONS

This application is a continuation of and claims priority to U.S. patent Ser. No. 16/205,967, filed Nov. 30, 2018, and entitled "VISUAL AND CODE VIEWS IN A PROCESS WORKFLOW USER INTERFACE". The content of the foregoing application is hereby incorporated by reference in its entirety for all purposes.

FIELD

The present disclosure relates generally to workflow depictions in a graphical user interface, and more particularly to utilizing visual and code views of workflow component representations.

BACKGROUND

Workflow diagrams enable a user to depict a logical flow of a process, such as with conditional branches that allow the process flow to vary in progression dependent upon conditions available as inputs to the workflow (e.g., 'if-then'). Workflows may be passive depictions, showing only a visual representation of the workflow, or represent active workflows that have underlying functionality and programming code. Although users may be able to alter the functionality and conditional logic of decision points within an active workflow, the level of technical skill may vary greatly amongst users, where for instance non-technical users may want a more human-readable logic depiction of a conditional workflow component for modification, but a technically skilled user (e.g., with programming skills) may want access to the underlying code to make changes. Additionally, a technically skilled user may want to have access to a variety of different levels of complexity representation (e.g., access to the underlying code for instances where they want to alter a process, but a reduced complexity representational view where they only want access to basic functions).

Therefore, there is a need in the art for methods and systems that accommodate technological-level representational preferences amongst users of active workflows.

SUMMARY

In an aspect, a computer-implemented method for modifying a workflow condition may include displaying a workflow component through a graphical user interface, where the workflow component includes at least one visual depiction of a function associated with the workflow component; and changing a representational view of the workflow component from a first representational level to a second representational level when a detail level selector is changed. In embodiments the first representational level may be a constrained representation and the second representational level of detail is a programming code representation. The representational view may be switched back and forth between the first representational level and the second representational level through the detail level selector. The detail level selector may provide for selection of at least three levels of detail, such as where the at least three levels of detail are selected from a visual representation level, a constrained representation level, a stylized representation level and a programming code representation. A functionality associated with the workflow component may be modified at the second representational level, such as where the modifying is made through a template selection from a plurality of pre-existing workflow component templates and/or the modifying is made through modification of an underlying code representing the functionality.

In an aspect, a computer-implemented method for modifying a workflow condition may include displaying a workflow component through a graphical user interface, where the workflow component includes at least one visual depiction of a function associated with the workflow component, where the function is executed by programming code stored in memory, where a source of the programming code is a third-party service provider; changing a representational view of the workflow component from a first representational level to a second representational level; and modifying the programming code. In embodiments, the modifying of the programming code may cause a communication with the third-party provider, such as where the communication with the third-party provider facilitates acceptance of the modifications made to the programming code by the third-party provider.

In an aspect, a computer-implemented method for modifying a workflow condition may include displaying a workflow component through a graphical user interface, where the workflow component includes at least one visual depiction of a function associated with the workflow component displaying a first level of representation of the workflow component when the workflow component is selected; and locking out a view of a second level of representation of the workflow component.

In an aspect, a computer-implemented method for modifying a workflow condition may include displaying a workflow component through a graphical user interface, where the workflow component includes at least one visual depiction of a function associated with the workflow component, where the function is associated with an underlying software programming code that can execute the function; modifying the underlying software programming code; and altering the displaying of the at least one visual depiction based on the modifying of the underlying software programming code. In embodiments, altering the displaying of the at least one visual depiction may include a visual representation of the function. The at least one visual depiction may be one of a visual representation of a functional input, a visual representation of a functional output, and a visual representation of a functional constraint. Altering the displaying of the at least one visual depiction may include displaying at least a portion of the underlying software programming code in displaying the workflow component.

In an aspect, a system for modifying a workflow condition may include a graphical user interface for displaying a workflow component including at least one visual depiction of a function associated with the workflow component, where a representational view of the workflow component is changed from a first representational level to a second representational level when a detail level selector coupled to the graphical user interface is changed. In embodiments, the first representational level may be a constrained representation and the second representational level of detail is a programming code representation. The representational view may be switched back and forth between the first representational level and the second representational level through the detail level selector. The detail level selector may provide for selection of at least three levels of detail, such as where the at least three levels of detail are selected from a visual representation level, a constrained representation level, a stylized representation level and a programming code representation. A functionality coupled with the workflow component may be modified at the second representational level, such as where the workflow component is modified through a template selection from a plurality of pre-existing workflow component templates and/or the workflow component is modified through modification of an underlying code representing the functionality.

In an aspect, a system for modifying a workflow condition may include a graphical user interface for displaying a workflow component including at least one visual depiction of a function coupled with the workflow component; and a memory for storing a programming code for execution of the function, where a source of the programming code is a third-party service provider, where a representational view of the workflow component displayed on the graphical user interface is changed from a first representational level to a second representational level through a function coupled to the graphical user interface to enable a modifying of the programming code. In embodiments, the modifying of the programming code may cause a communication with the third-party provider, such as where the communication with the third-party provider facilitates acceptance of the modifications made to the programming code by the third-party provider.

In an aspect, a system for modifying a workflow condition may include a graphical user interface for displaying a workflow component including at least one visual depiction of a function coupled with the workflow component displaying a first level of representation of the workflow component when the workflow component is selected that locks out a view of a second level of representation of the workflow component.

In an aspect, a system for modifying a workflow condition may include a graphical user interface for displaying a workflow component including at least one visual depiction of a function associated with the workflow component; a memory for storing an underlying software programming code for execution of the function; a processor for modifying the underlying software programming code; and the processor altering the displaying of the at least one visual depiction based on the modifying of the underlying software programming code. In embodiments, altering the displaying of the at least one visual depiction may include a visual representation of the function, such as where the at least one visual depiction is one of a visual representation of a functional input, a visual representation of a functional output, and a visual representation of a functional constraint. Altering the displaying of the at least one visual depiction may include displaying at least a portion of the underlying software programming code in displaying the workflow component.

BRIEF DESCRIPTION OF THE FIGURES

FIG. 3 depicts a workflow summary for a risk order condition being executed in an embodiment of the present disclosure.

FIGS. 11-11A depict an embodiment of a workflow view showing an actual code representation for a workflow component.

DETAILED DESCRIPTION

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

Figure 1:
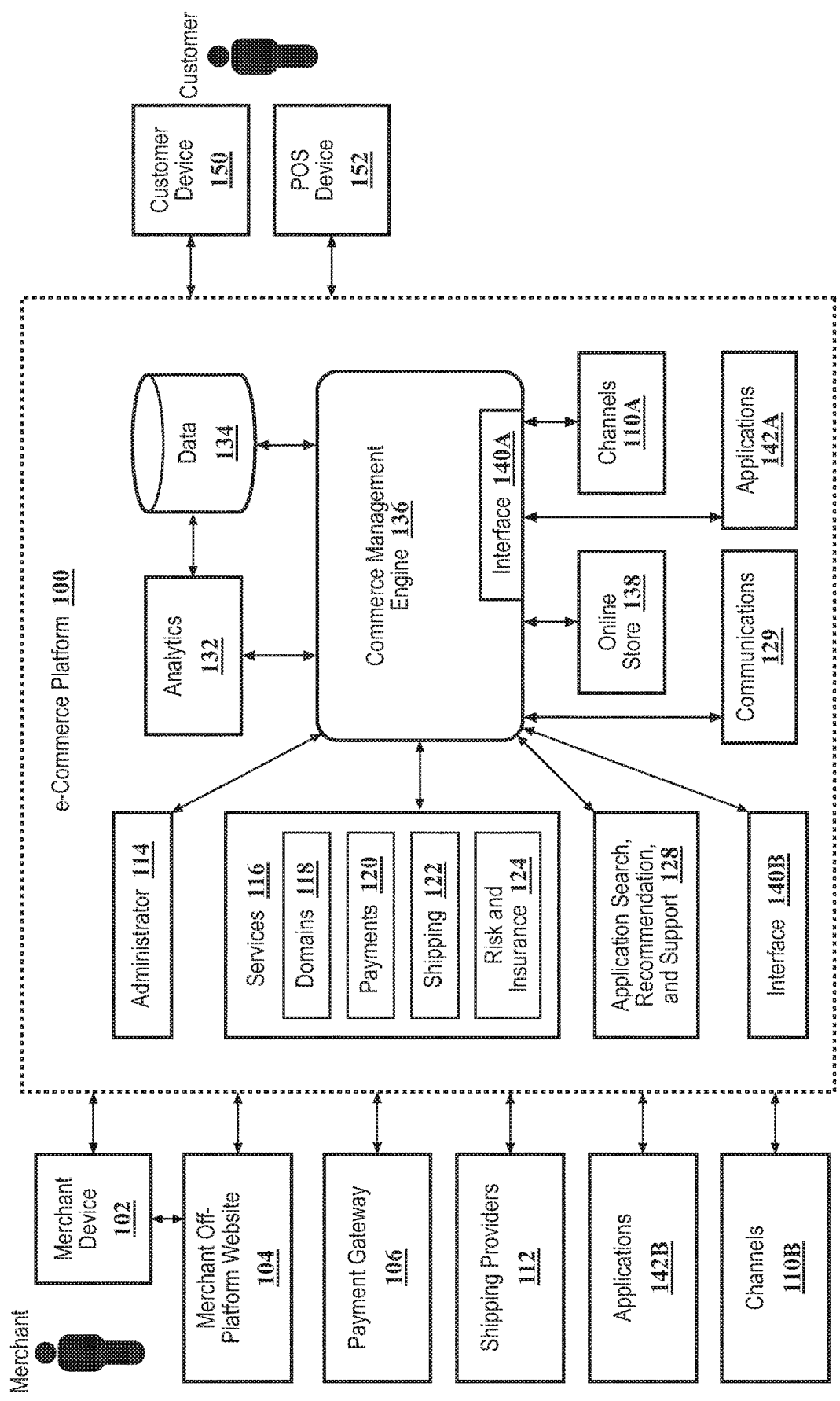
FIG. 1 depicts an embodiment of an e-commerce platform.

With reference to FIG. 1, an embodiment e-commerce platform 100 is depicted for providing merchant products and services to customers. While the disclosure throughout contemplates using the apparatus, system, and process disclosed to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as s service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
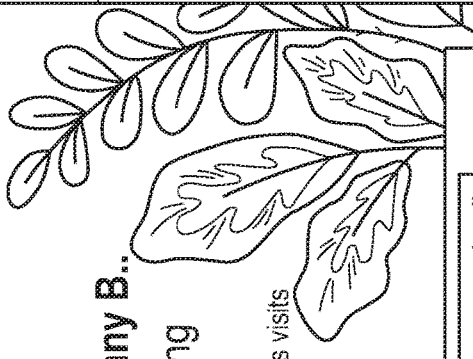
FIG. 2 depicts an embodiment of a home page of an administrator.

FIG. 2 depicts a non-limiting embodiment for a home page of an administrator 114, which may show information about daily tasks, a store's recent activity, and the next steps a merchant can take to build their business. In embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In embodiments, an application 142A may be provided by the same party providing the platform 100 or by a different party. In embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In embodiments, rather than violating the isolation principle, it may be preferred to move these components out of the commerce management engine 136 and into their own infrastructure within the e-commerce platform 100.

In embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In embodiments, core products, core extension points, applications, and the administrator 114 may be developed to work together. For instance, application extension points may be built inside the administrator 114 so that core features may be extended by way of applications, which may deliver functionality to a merchant through the extension.

In embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In embodiments, partners, application developers, internal applications facilities, and the like, may be provided with a software development kit (SDK), such as through creating a frame within the administrator 114 that sandboxes an application interface. In embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In embodiments, update events may be queued and processed asynchronously from a state change that triggered them, which may produce an update event notification that is not distributed in real-time.

In embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements, and the like). Integration applications may include applications that provide useful integrations that participate in the running of a business, such as shipping providers 112 and payment gateways.

In embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In embodiments, the payment gateway 106 may accept international payment, such as integrating with leading international credit card processors. The card server environment may include a card server application, card sink, hosted fields, and the like. This environment may act as the secure gatekeeper of the sensitive credit card information. In embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In embodiments, the e-commerce platform 100 may enable merchants to keep track of changes to the contract of sales over time, such as implemented through a sales model component (e.g., an append-only date-based ledger that records sale-related events that happened to an item).

In embodiments, the e-commerce platform 100 may provide process flow services, such as merchant workflows associated with purchases, inventory, finances, fulfillment, marketing and promotions, risk mitigation, customer support, business administration, and the like. For instance, a merchant may want to create a workflow that specifies a purchase process, an inventory process, a financial process, and the like, showing conditional decisions made by the e-commerce platform 100 dependent upon merchant preferences, products for purchase, customer inputs, customer preferences, and the like. For example, an inventory process workflow may determine the process through which inventory is maintained for a merchant. The workflow may include various workflow components, each of which may represent decision points, conditions, logical connections, inputs, calls, conditional branching, and the like. For instance, a workflow component within the inventory process may set a level for purchasing new inventory (e.g., if inventory falls below a count of 25 for an item, send a message to the vendor to re-order the item to at least a level of 50 items). In an active workflow, a workflow component may comprise an underlying functionality executed through programming code. In embodiments, a user may have the option to view the underlying functionality at different levels of representation, such as along a spectrum which may include (1) a visual representation, possibly only with text (e.g., inside a box) describing the functionality of the workflow component, (2) a constrained representation such as where values and logical conditions of the functionality are exposed for a user to view and alter, (3) a stylized code representation where the actual code executing the functionality is represented at a higher level of abstraction, (4) the actual code that executes the functionality of the workflow component, and the like.

Figure 4:
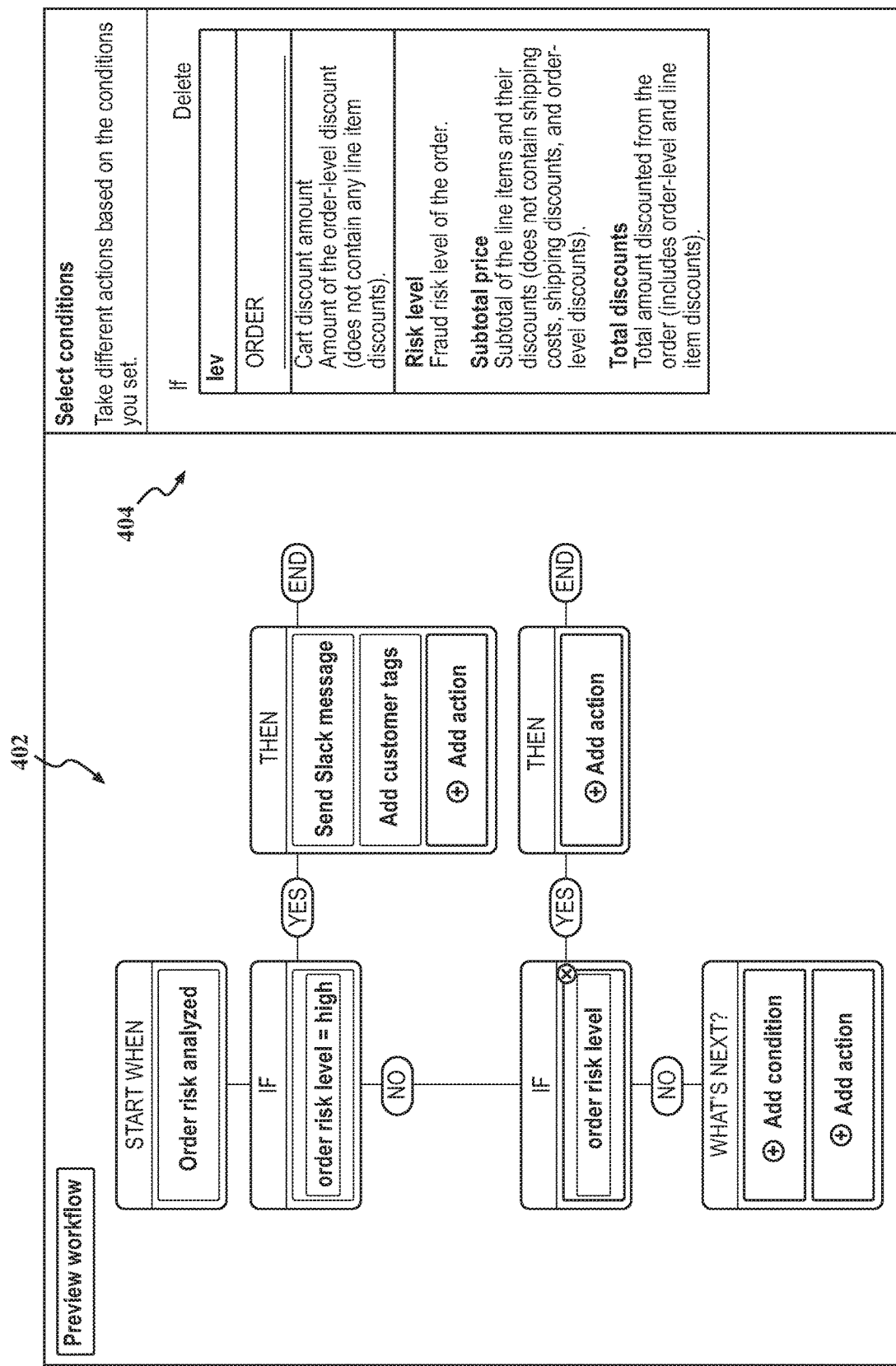
FIG. 4 depicts a visual representation of the basic logic within the component boxes and in a panel in an embodiment of the present disclosure.
Figure 5:
FIG. 5 depicts a view for browsing for workflow templates in an embodiment of the present disclosure.

In embodiments, a user may work within a workflow editor, browse for workflow component templates, compose workflows, and the like. FIGS. 3-5 show non-limiting example embodiments illustrating how a user can compose a workflow in a visual view. For instance, FIG. 3 depicts a workflow summary for a risk order condition being executed after an order risk has been analyzed, and FIG. 4 depicts that condition represented in workflow components (e.g., "order risk level=high" and "order risk level") within a workflow, where FIG. 4 shows a visual representation of the basic logic within the component boxes 402, as well as in the right panel 404. In embodiments, workflows may be created from scratch, edited from existing workflows, created from a selected workflow template, and the like. For instance, in a non-limiting example embodiment, FIG. 5 depicts a view for browsing for workflow templates. In embodiments, workflow templates may be templates for individual workflow components, templates for workflow sub-processes, templates for an entire process, and the like. For example, there may be a template for the order risk workflow component depicted in FIG. 4, a template for a purchase sub-process including the order risk workflow component, a template for an entire purchase and inventory process, and the like.

Figure 6:
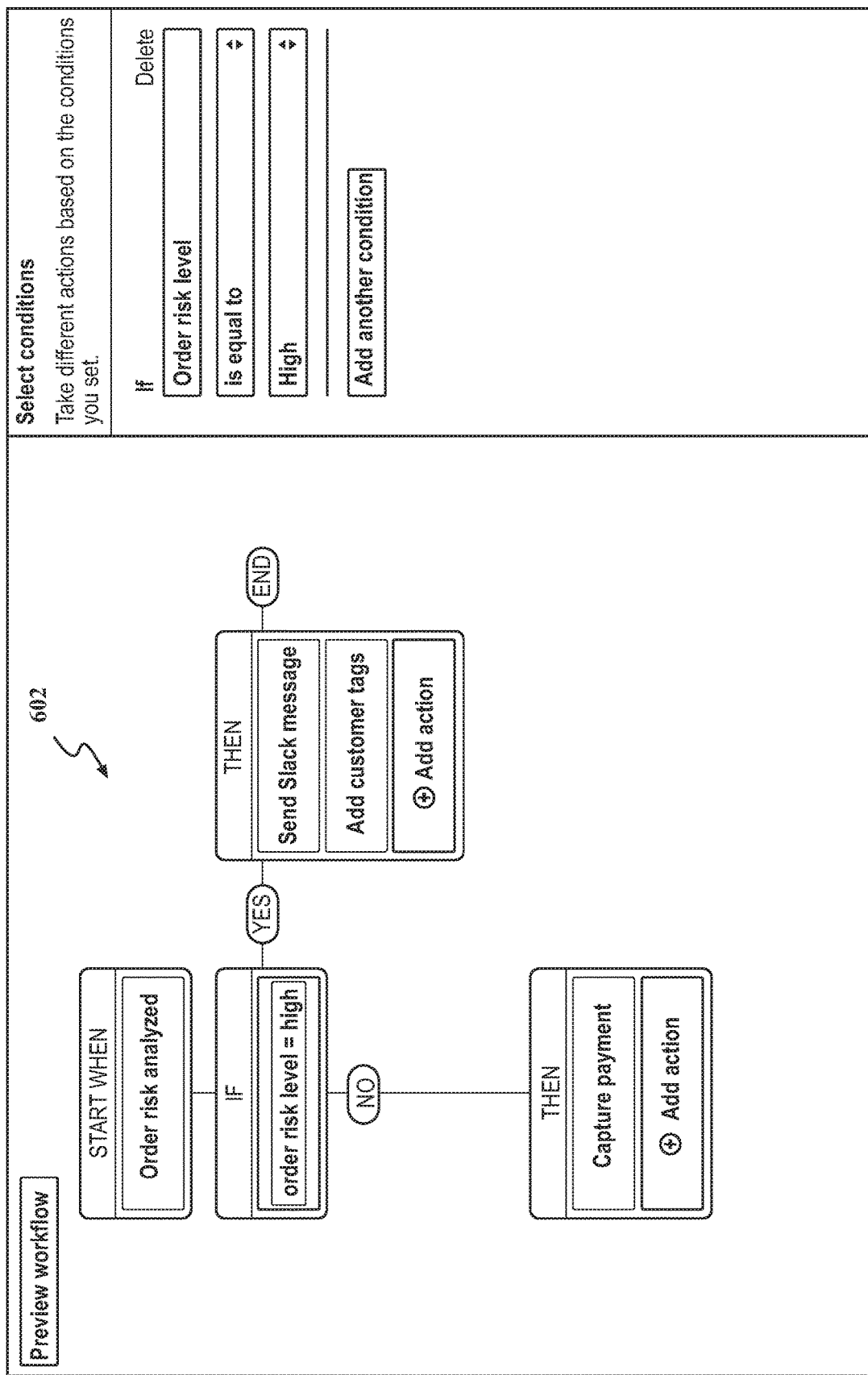
FIG. 6 depicts an editor view showing conditional functionality represented in a visual representation of the workflow component in an embodiment of the present disclosure.
Figure 7:
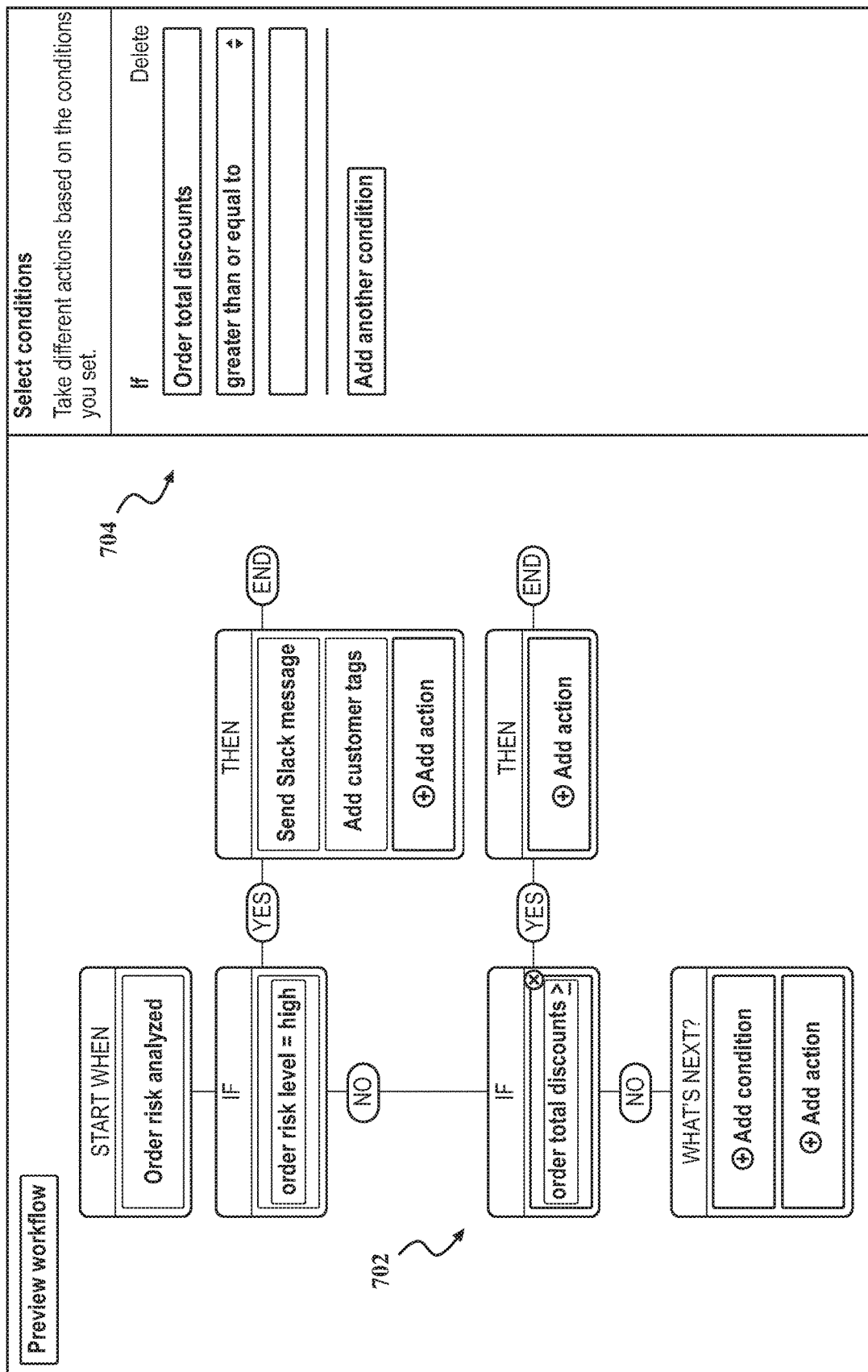
FIGS. 7 and 8 depict a user adding a workflow component to a workflow in an embodiment of the present disclosure.
Figure 8:
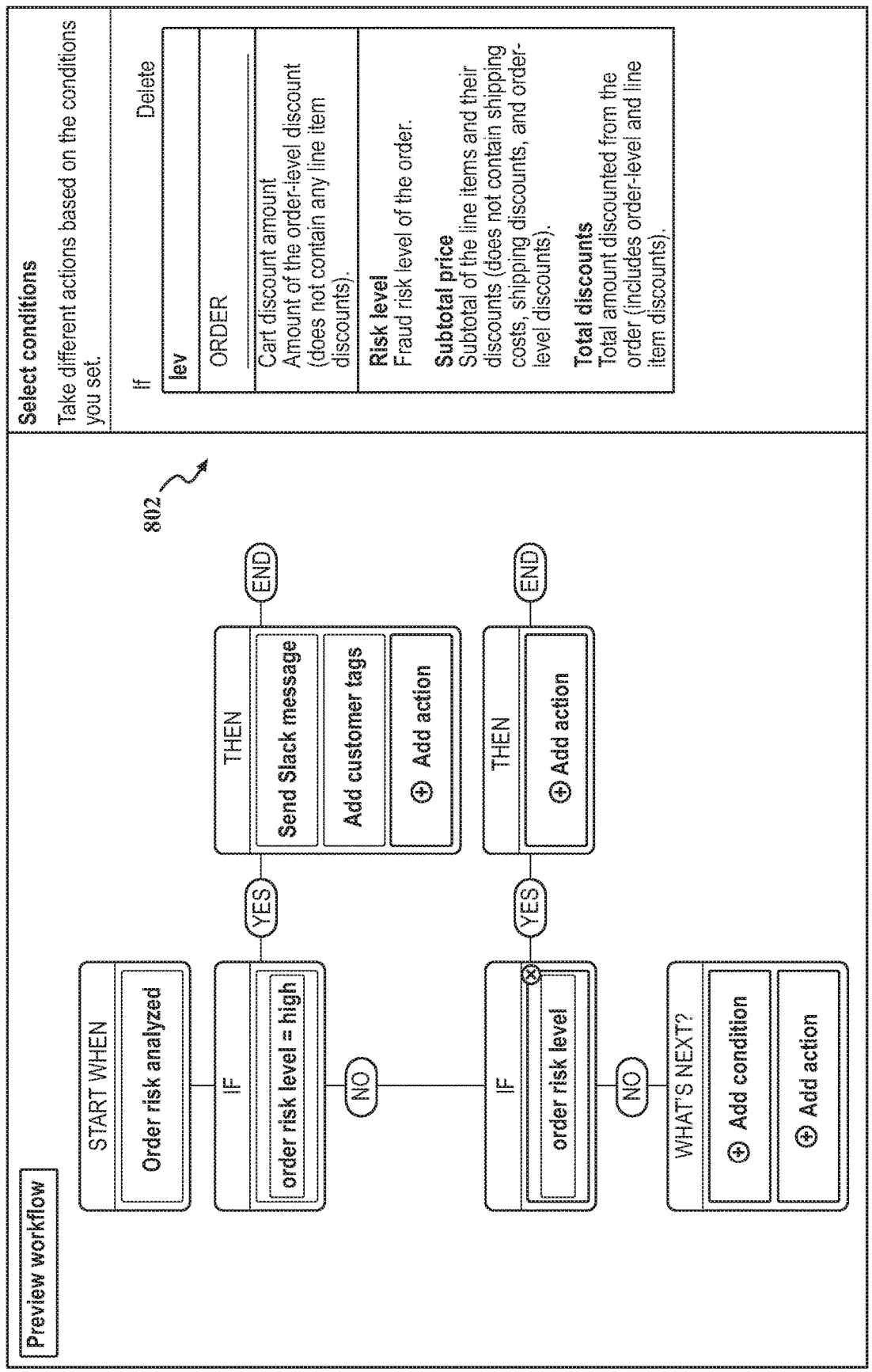

A user may be able to select a workflow component within the workflow and view different levels of representation with respect to the related functionality. FIGS. 6-8 show non-limiting example embodiments illustrating how a user can edit inside a workflow, where a user may be able to view and edit basic conditional functionality in a visual representation of a workflow component, such as within the workflow component, in a side panel, and the like. FIG. 6 depicts an editor view showing basic conditional functionality 602 represented in a visual representation of the workflow component as well as in the panel to the right. FIG. 7 illustrates a user adding a new workflow component 702, such as for instance, for "order total discounts ≥" within the workflow, where the basic conditional functionality 704 is also provided in the sidebar with "order total discounts" and "greater than or equal to". FIG. 7 also illustrates a function button to "add another condition", where FIG. 8 shows an example of other conditions 802 that could be added, such as including "cart discount about", "risk level", "subtotal price", "total discounts", and the like, as illustrated.

In embodiments, the e-commerce platform 100 may provide an option to users to view multiple levels of detail for the representation of functionality in a workflow component, such as in accordance with the user's interest in modifying the underlying functionality, the user's technical abilities with respect to modifying the underlying code, and the like. For instance, a user may be non-technical or a novice user and want to view a human-readable version of the functionality, a user may be an intermediately skilled user and want to view a more stylized code version of the actual code, a user may be a sophisticated/advanced user and want to view the actual code associated with the functionality, and the like. Additionally, a technically skilled or other user may want to have access to a variety of different levels of representation (e.g., access to the actual code for instances where the user wants to alter a function, but a reduced complexity representation (e.g., constrained representation or stylized representation) when the user only wants access to basic functions). While the disclosure throughout contemplates using various levels of representation with respect to the underlying code for the functionality of a workflow component, for simplicity the description herein will refer to 'novice', intermediate' and 'sophisticated' users. Further, while the disclosure throughout contemplates a spectrum of representational levels, for simplicity the description herein will refer to a visual representation, constrained representation, stylized representation, and actual code representation. All references to 'novice', intermediate' and 'sophisticated' users and visual representation, constrained representation, stylized representation, and actual code representation throughout this disclosure should also be understood to represent multiple levels of representation for complexity and detail associated with the underlying code across any spectrum of complexity, across any number of levels of complexity, and amongst any number of levels of technically skilled user.

In embodiments, the user may be presented with a graphical representation (e.g., a button, slider, and the like) through a graphical user interface and the like, for selecting the level of representation for the underlying code associated with the workflow component. For instance, a graphical switch or slider may be presented that allows the user to select the level of representation, such as showing a constrained representation at a novice setting, a stylized code representation at an intermediate setting, the actual code at a sophisticated user setting, and the like. In embodiments, the user may select the level of representation for the underlying code associated with a functionality via a voice input, a voice-to-text input, a command prompt, a gesture, and the like. In embodiments, the user may set one level of representation and then toggle between that level of representation and a second level of representation (e.g., for viewing present or modified versions of the functionality and/or code). For instance, a user may toggle between a novice level and an intermediate level, between a novice level and a sophisticated user level, between an intermediate level and a sophisticated user level, and the like. In embodiments, a representation level selector may be integrated with or separate from a level toggle switch. In embodiments, selectors may be provided for all workflow components or selected workflow components. For instance, a user may want to view a novice level as a default, but then select one or more individual workflow components for greater detail of representation (e.g., in order to modify the code of the selected workflow components).

In embodiments, a user specifying a level of representation may result in an action by the e-commerce platform 100, such as setting a default level of representation, providing a certain level(s) of representation but not others, and the like. For instance, a sophisticated user may not want to ever see the novice level and always be presented with the actual code, a novice user may want to be prevented from viewing higher levels of detail, and the like. In embodiments, the e-commerce platform 100 may lock out higher levels of representation for a less skilled user in order to prevent inadvertent corruption or adverse impact to the code, and thus better ensure the user's workflow remains functional.

Figure 9:
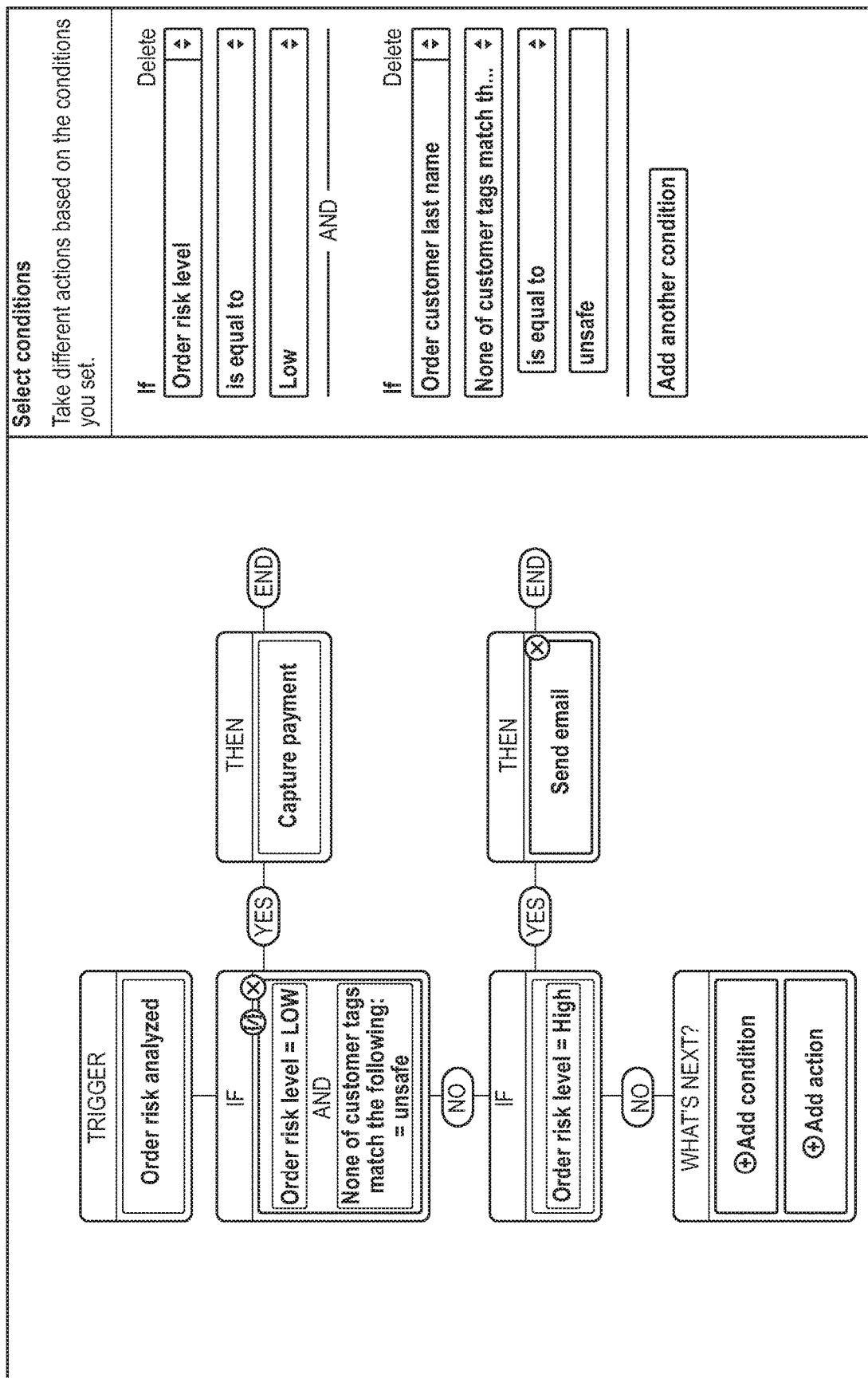
FIG. 9 depicts an embodiment of a workflow view showing a visual representation for a workflow component.
Figure 10:
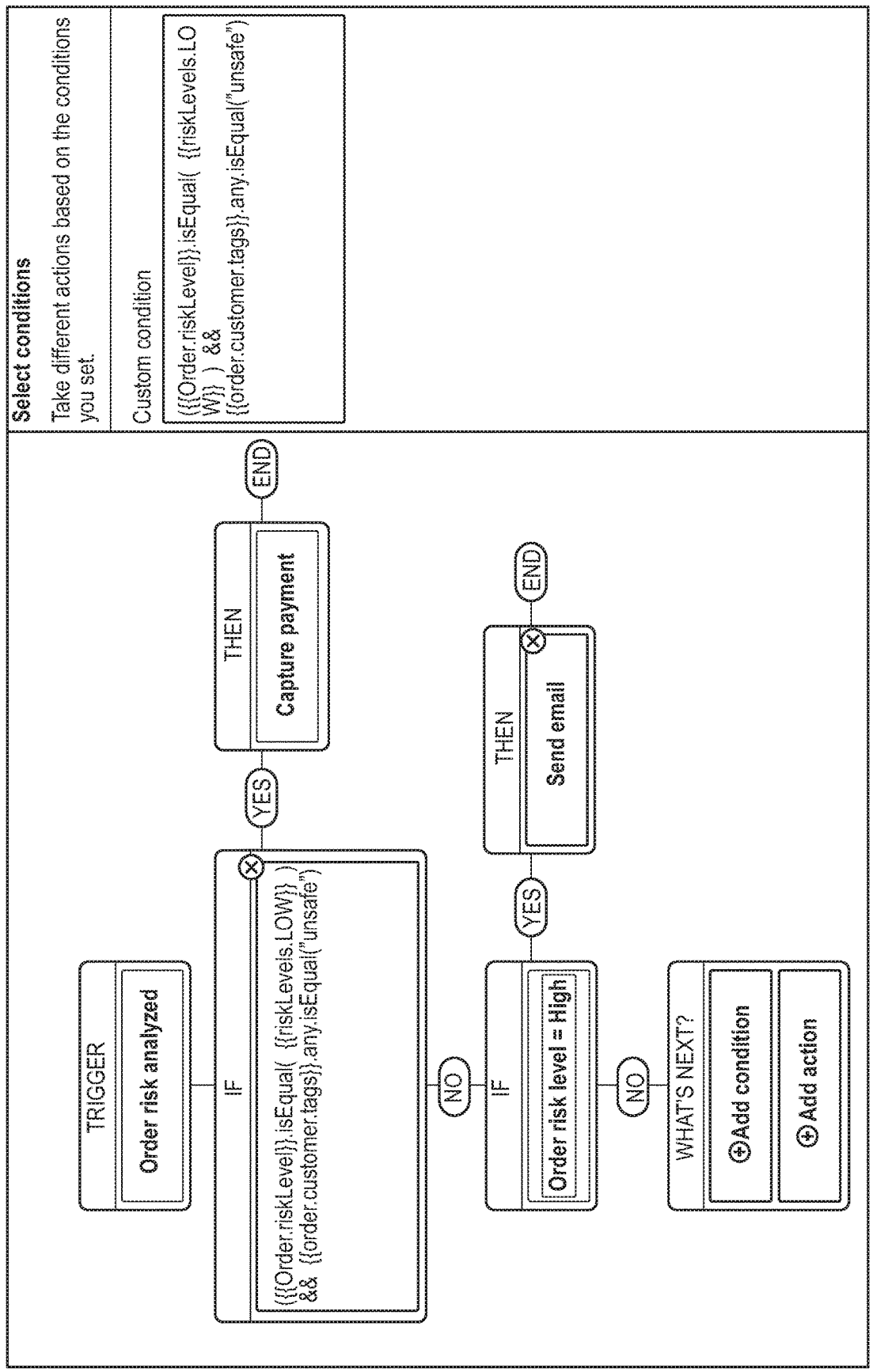
FIG. 10 depicts an embodiment of a workflow view showing a stylized code representation for a workflow component.
Figure 11:
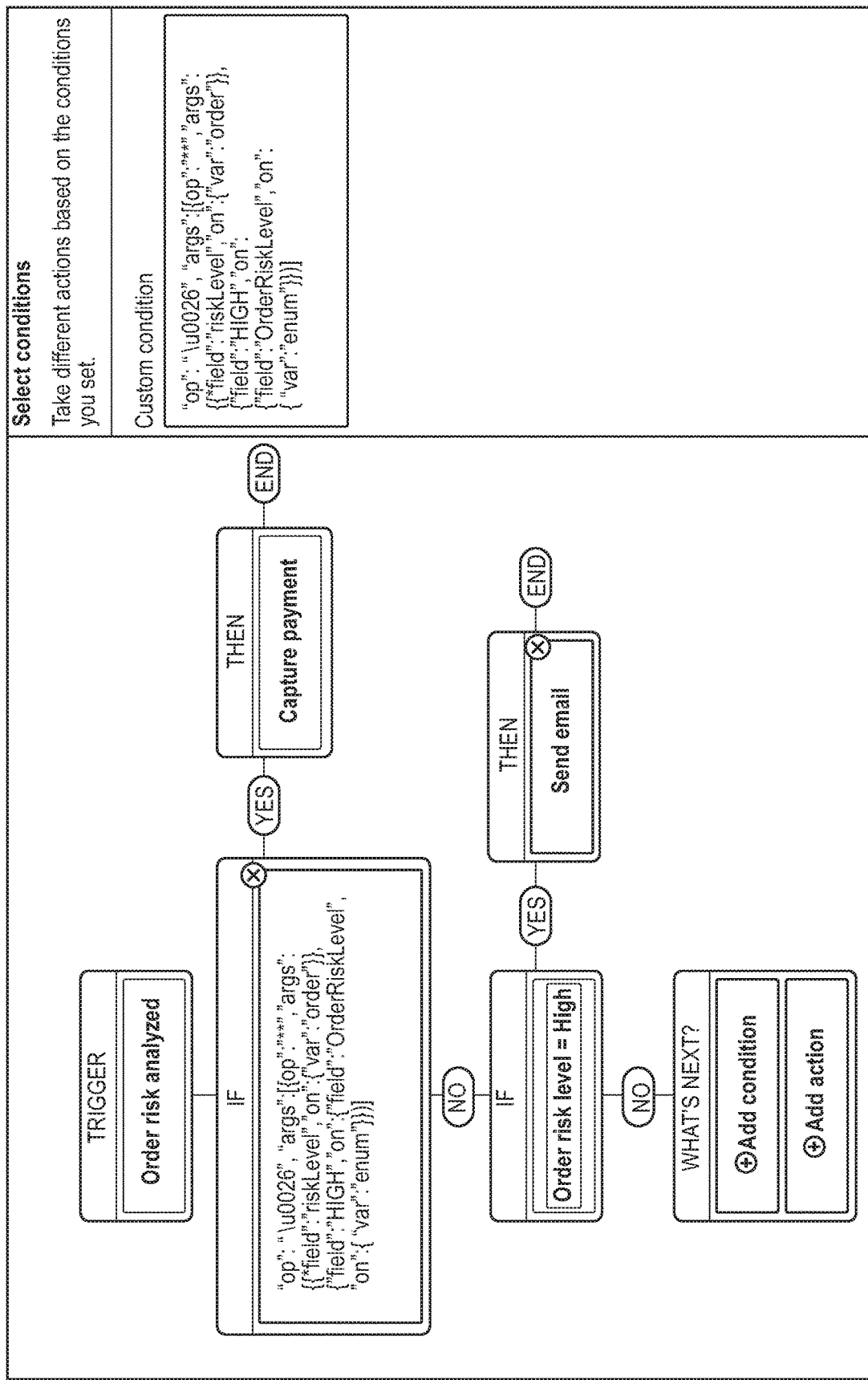

In an example of different levels of representation, and how a user may toggle between them, FIGS. 9-11 illustrate non-limiting example embodiments of a workflow view showing a visual representation (FIG. 9), a stylized code representation (FIG. 10), and an actual code representation (FIG. 11) for a workflow component. In these views, the same workflow component is shown with different levels of representation, where the representative logic or code is shown presented inside the workflow component and in a side bar. As such, the user may be able to toggle between different levels of representation. One skilled in the art will appreciate that the representations of the content within the workflow component in FIGS. 9-11 is meant to be illustrative and not limiting in any way, such as in the visual representation presented for the workflow component illustrated in FIG. 9, order risk level=Low AND none of customer tags match the following: =unsafe, the constrained representation presented for the workflow component illustrated in FIG. 10, ({{Order.riskLevel}}.isEqual({{riskLevels.LOW}}) &&
{{order.customer.tags}}.any.isEqual("unsafe"), and the actual code representation presented for the workflow component illustrated in FIG. 11, "op":"\u0026", "args":[{"op":"*","args": [{"field":"riskLevel", "on":{"var":"order"}},
{"field": "HIGH", "on":{"field": "OrderRiskLevel", "on":{ "var":enum"}}}].

The ability to view the underlying code at different levels of representation provide a user flexibility with respect to creating, viewing, and editing. For instance, through a constrained representation, rather than building conditions using the visual representation, properties may be specified from a controlled set using pseudocode. Depending on the type of property (e.g. string, Boolean, object, array, and the like), various functions (e.g. aggregations, comparison, isEqual( ), first( ), contains( ), max( ), and the like) may be made available, and may take in one or more parameters. This builds an expression which could be connected to other expressions, e.g. by other aggregating functions, or Boolean logic such as AND, OR, and the like. The constrained representation may be constrained to a set of functions, variables, Boolean operators, and the like, and so may represent a more flexible condition editor that's easier for a user to manage than actual code might be for the particular workflow component. Optionally, a user may wish to directly access the actual code for the workflow component, such as in FIG. 11, or toggle back and forth or along a spectrum of representation for the underlying code for the workflow component. Alternatively, a user may wish to be unconstrained by the boundaries of specific workflow components, and work directly in the underlying code, such as illustrated in a non-limiting example embodiment of FIG. 11A, where a user may be able to view and edit the actual code, such as in its entirety.

Figure 12:
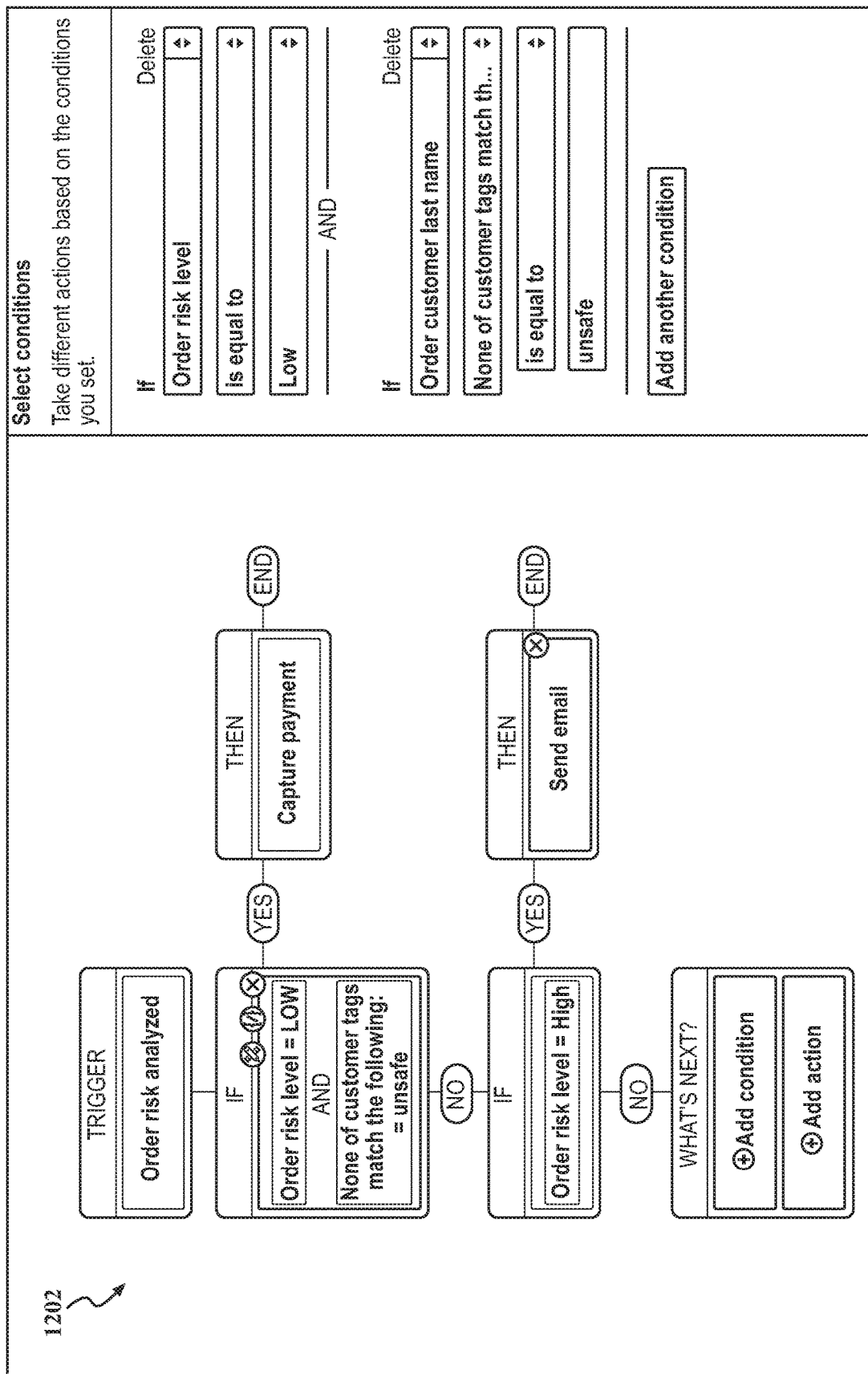
FIG. 12 depicts a novice level of representation in a workflow view in an embodiment of the present disclosure.

In embodiments, the capabilities for providing different levels of representation may extend to adding new workflow components (e.g., adding a new pre-existing workflow component, starting a new workflow component from scratch, starting a new workflow component through a template component, and the like), such as where the user has the option to add new workflow components and selecting those new workflow components with a given level of representation. For instance, a novice user may choose to always select a novice level of representation, such as shown in FIG. 12, where the visual editor creates a basic representation 1202, such as by imposing some assumptions about how a condition is defined. For instance, the visual editor may take in certain kinds of objects, and output a single Boolean result, which directs the workflow to proceed along the Yes or No paths. Alternately, the novice user may elect to show a slightly more advanced visual representation 1302, such as in FIG. 13, where that assumption is now a configurable item, such as where the user may change the definition of the condition to take in certain other objects and may configure that conditional logic output to be something other than a single Boolean. For example, the conditional logic may be a Boolean AND and an HTTP status code, and based on the combination of the two, the workflow might proceed along one of many paths (e.g., "Yes" and "200 OK" down one path, "Yes and "400 Bad Request" down a different path, "No" and "200 OK" down a third path, and the like). Or the user may be able to change the condition to not return a Boolean at all, but instead, some enumerable property that the user has defined elsewhere, e.g., an Order Risk Level of "HIGH", "MEDIUM", or "LOW", and the like. The choice of output will then influence how the condition must be composed, whether through a dropdown builder (as shown in FIG. 13), or through other levels of representation.

Figure 13:
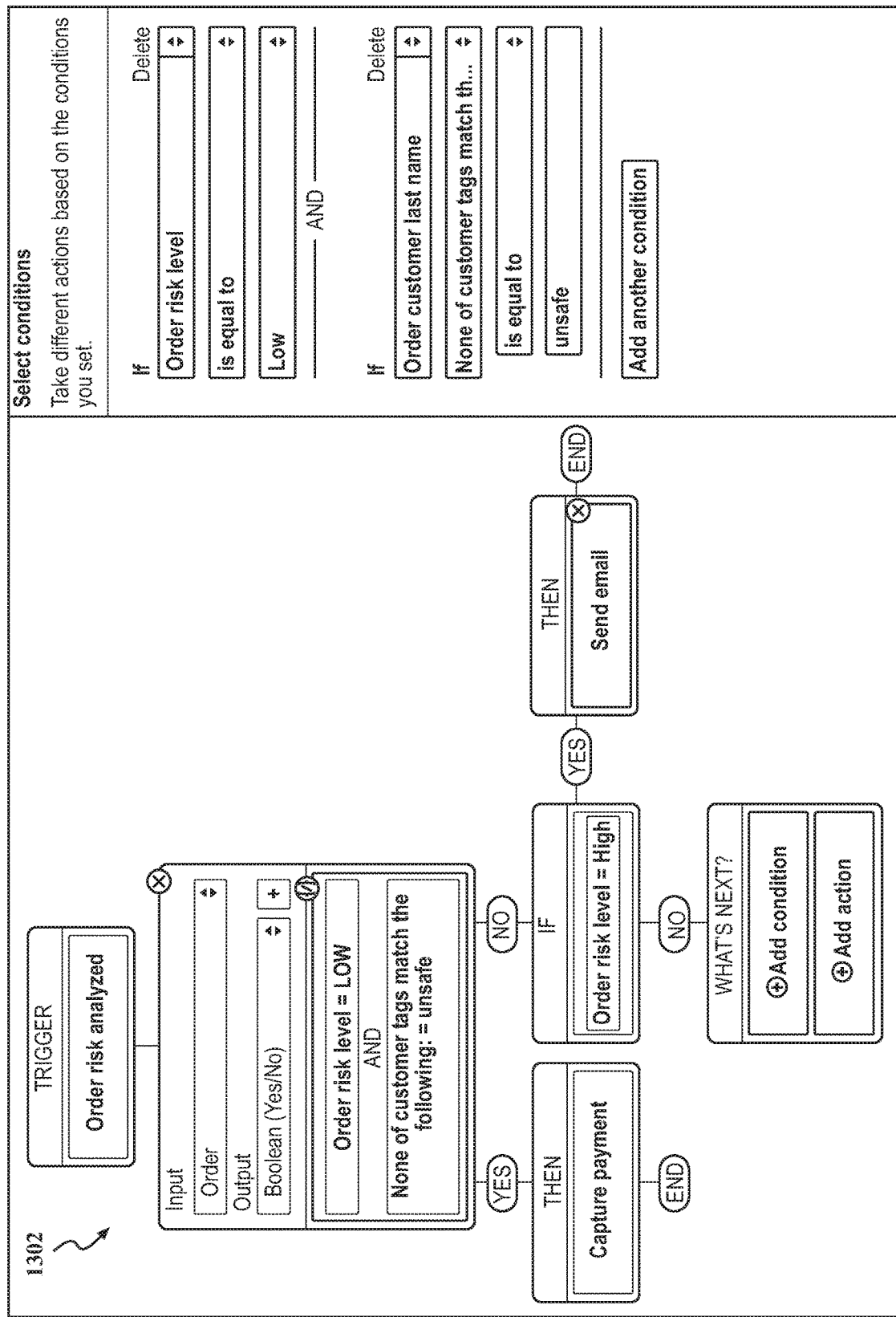
FIG. 13 depicts an advanced level representation in a workflow view in an embodiment of the present disclosure.
Figure 14:
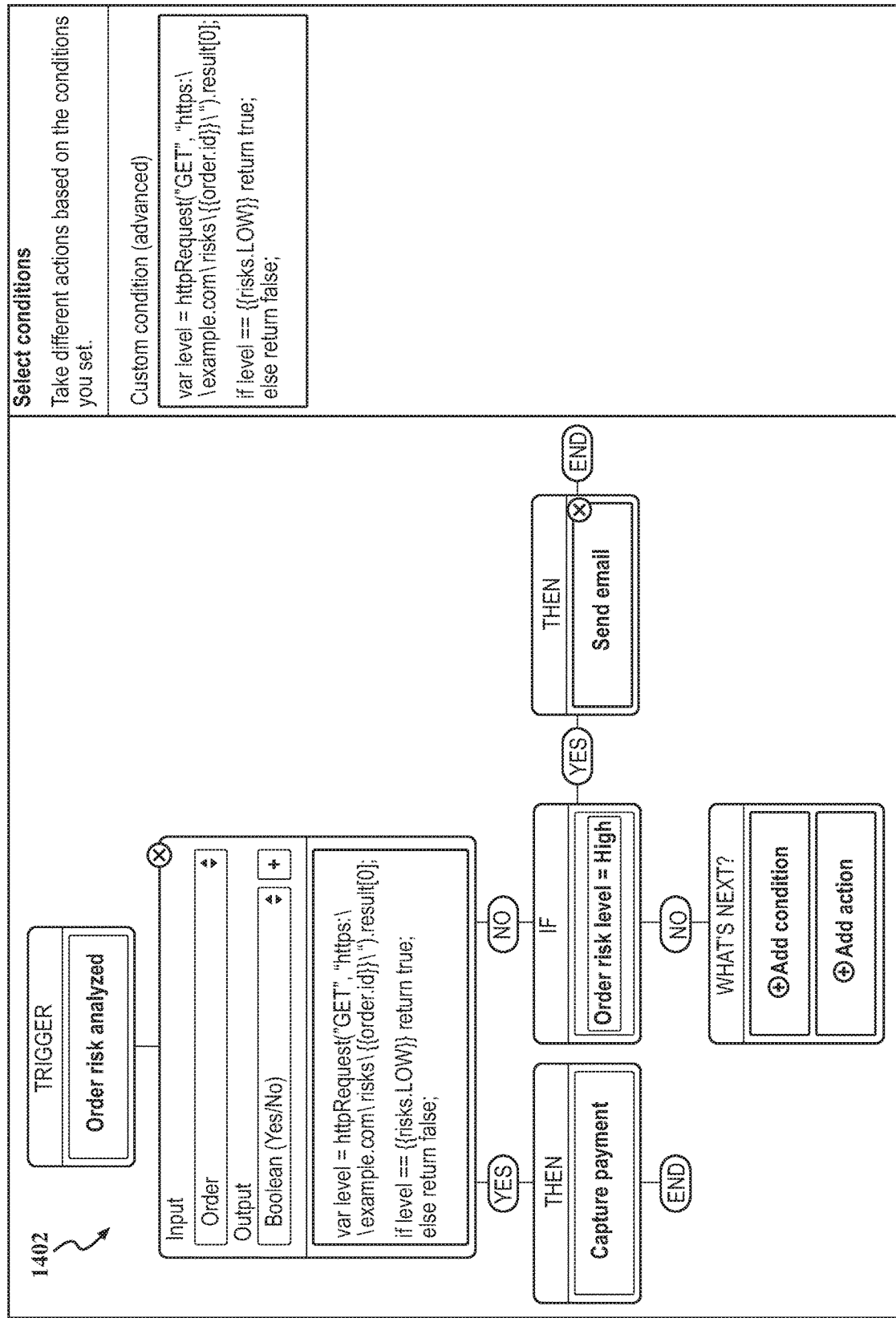
FIG. 14 depicts an additional advanced level representation in a workflow view in an embodiment of the present disclosure.

Although three illustrative levels of representation have been utilized in this disclosure for practicality of presentation (visual, constrained, and actual code representations), FIGS. 12 and 13 provide an example of how the user may be able to select and move across a spectrum of representations, where FIG. 13 represents a slightly greater level of complexity for a 'visual representation' over FIG. 12. Further, a more advanced user may choose to show a more sophisticated representation 1402 when adding a new workflow component, such as shown in FIG. 14. As described herein, once a user has added the new workflow component, the user may then switch between different levels of representation.

A visual representation of a workflow can be broken up into a number of workflow components, flowing from one to the next through the workflow, and each having a 'boundary' of functionality (e.g., functionality assigned to individual workflow components, which may be represented visually as a box or other shaped object) within the workflow. For instance, one workflow component may contain an input condition (e.g., what is the inventory level of an item?), which flows into a next workflow component containing a compare and branching decision point (e.g., if the inventory is less than 25 then send a message to the vendor to re-order the item). The underlying code of these two workflow components may execute seamlessly as execution flows from one to the next, but the functionality of the input workflow component (what is the inventory level) and the conditional branching workflow component (order more inventory if there is less than 25 items) can be visually represented, segmented, between the two visually presented workflow components in the workflow. However, when a user creates a new workflow component, or modifies an existing workflow component, in one level of representation, the e-commerce platform 100 must create or maintain boundaries within all the levels of representation.

When a user creates workflow components at a visual level of representation, the e-commerce platform typically knows the functional boundaries of those workflow components and is able to generate the other levels of representation. For instance, as the workflow is being visually composed the e-commerce platform 100 may be creating the code that underlies the visual representation, so it may know with certainty which code is associated with each workflow component in the workflow. At the same time, knowing the boundaries, the e-commerce platform 100 may also be able to generate the constrained and stylized representations for each workflow component.

When a user creates workflow components at the actual code representational level (e.g., at a command prompt), there is typically no corresponding visual representation being generated. The e-commerce platform 100 may then utilize a code parsing, interpretation and/or evaluation functionality and/or algorithm to parse the code, process the code, generate the functional boundaries between the workflow components, and from these boundaries generate the a visual representation of the code, whereby it associates aspects of the code with each workflow component in the visual representation. In embodiments, this process may also be utilized when a user creates a workflow at any intermediate level of representation, where once the visual representation level is generated, the e-commerce platform 100 knows the boundaries between the workflow components, and may then generate the other levels of representation.

In embodiments, one way that the code evaluation and parsing algorithm may decide how to (or whether to) parse the code may be through determining a level of certainty associated with the potential that all of the new code can be represented by a single visual workflow component. That is, below a certain threshold of certainty, the functions executed within a block of new code may need to be depicted in multiple visual workflow components within the workflow. In embodiments, the e-commerce platform 100 may determine a certainty value for the new code, such as based on the extent to which the code is different from preexisting code (e.g., in templates, from existing workflow components, and the like), the size of the change relative to recognized code, the size of the new code, and the like. If a certainly value falls below a predetermined threshold, the e-commerce platform 100 may create new visual workflow components within the workflow that correspond to identified parsed functionally within the code.

In embodiments, the code evaluation and parsing algorithm may identify one or more existing visual workflow components that may represent the code. In a non-limiting example, new code may be determined to be an expanded representation of one or more existing visual workflow components, where the existing visual workflow components have existing functional representations, such as for inputs to the visual workflow component (e.g., certain properties such as an order ID and the like), outputs (e.g., an HTTP status code, a Boolean result, and the like), constraints (e.g., delivering a response of a certain form to a certain endpoint within a time period), and the like. As such, the new code may be inserted in place of the more limited code provided by the more simplistic representations of the existing visual workflow component, where the new code functions within the input, output, and constraints of the existing visual workflow component. In embodiments, in the instance where the inputs, outputs, and constraints between the new code and the existing visual workflow component do not align, the code evaluation and parsing algorithm may initiate a process through which a new or modified visual workflow component is generated. For example, the new code may fit well with an existing visual workflow component but require an additional input that is not currently defined. In this instance, a modified version of the existing visual workflow component may be generated with the new input. In embodiments, this process may be mediated through a user interface where the user generating the code is able to interactively aid in the generation of a new or modified visual workflow component. Alternately, the code evaluation and parsing algorithm may determine that the code has no clear analogue to existing visual workflow components. In this instance, the code may be maintained as such within the workflow representation, such as where the code is shown as code in the higher levels of representation. For example, when a user is viewing the workflow at the visual representation level, the code may be shown in an embedded view, such as shown within a visual workflow component, as described herein.

A user may also create workflows through use of a combination of multiple levels of representation, such as through creating workflow components at the visual representation level as well as at the code representation level. For instance, a user may start the creation of a workflow through the visual representation level but then decide to create the remaining workflow at the code level. In this instance, the process may be a combination of the e-commerce platform 100 generating the other levels of representations from the user creating workflow components at the visual representational level, and then parsing any code created at the code representational level to generate the visual level workflow components, which in turn generates all of the remaining representational levels.

When a user performs a modification to the functionality of an existing workflow component within a workflow at one level of representation, the platform 100 may determine the impact of that modification on the other levels of representation. In addition, when a user performs a modification to the functionality of an existing workflow component within a workflow, such as through access to a representation showing the actual code, the e-commerce platform 100 may need to verify that the modifications did not extend beyond the bounds of the visual depiction of the existing workflow component. For instance, if the user adds a completely new function to the branching workflow component, the visual depiction of the new block of code may need to be split, with some remaining within the confines of the existing visual workflow component and the rest in a new visual workflow component.

In embodiments, in the instance when a modification to a workflow component remains within the confines of the original workflow component (e.g., a simple modification), the e-commerce platform 100 may make that determination by calculating a level of certainty that the modification has not extended beyond the functional bounds of the original workflow component. If there is a certainty that the boundaries between workflow components has been maintained (e.g., because the e-commerce platform 100 provided the original workflow component and the change was minor), then the modification would not affect the visual depiction of the workflow components in the workflow. For example, a user may select the above-mentioned workflow component that branches on an inventory item falling below 25 items and modify the functionality that calculates the way the inventory level is determined. Given this simple change, the e-commerce platform 100 may determine a confidence level that no change (e.g., splitting of boxes, combining of boxes, addition of branching points, and the like) is required. In embodiments, the e-commerce platform 100 may determine this through calculating a certainty value based on whether modifications were made to an existing workflow component, a quality indicator for a user (e.g., based on past performance, self-reported technical proficiency, and the like), an extent of the modification (e.g., a percentage change from the original code), and the like. Based on a determined certainty value falling below a predetermined threshold, the e-commerce platform 100 may then determine that no change is required to the visual depiction of the workflow components.

A user may also make a more significant change to the code associated with a workflow component, such as more complicated than a simple 'adjustment' to a workflow component, but less complicated than creating new code from scratch. For instance, a user may select a view of the actual code of a workflow component and make significant changes to its code. The e-commerce platform 100 may determine a certainty value that indicates a boundary issue may exist. In this instance, the e-commerce platform 100 may run the evaluation and parsing algorithm to determine if the workflow component from which the user began needs to be changed or split in some way. For instance, the user may have opened the previously described inventory component to add a new decision point for executing a re-order based on a rating of the vendor, and this function may be best represented by a new workflow component. In embodiments, the e-commerce platform 100 may determine this through a parsing output from the evaluation and parsing algorithm, which may generate a splitting of the workflow component into multiple visual workflow components, such as one for the original function and one for the new decision point for evaluating a re-order based on a vendor rating.

In embodiments, code for workflow functionality may be provided by, and/or controlled by, a third-party provider. For instance, in a purchasing workflow there may be a decision point involving a third-party shipping provider 112 (e.g., a programming call to the shipping provider). A user may want to modify the called code for a user-specific application, but the code is controlled by the third-party provider, such as provided externally through an API connection, provided externally and pulled into a new body of code, and the like. In embodiments, the third-party code may be viewed at different levels of representation, such as by the user, by the third-party provider, by an administrator, and the like. Representational views may be toggled between levels of complexity, between original and modified versions (e.g., at different levels of representation), and the like. In this instance, the e-commerce platform 100 may initiate a communication with the third-party provider if a user attempts a modification to the third-party provider's code. The communication may initiate a review and authorization process with the third-party provider, such as resulting in acceptance and incorporation of the modification, denial of the modification, feedback from the third-party provider related to an on-going evaluation, and the like. For instance, the third-party provider may be able to toggle back and forth between different representational views of the modification as part of an authorization process. In turn, the e-commerce platform 100 may assign a confidence value to the modification and take further actions to ensure the quality of the modification.

While the disclosure throughout generally contemplates using various levels of detail with respect to representing underlying code, for simplicity the description herein has referred to workflow depictions. However, the notion described herein for depicting various levels of representations is not limited to workflow embodiments, but can be applied to any interface, editor, or development environment in which there is a spectrum of representations or abstractions of the code from visual to simplified to raw/actual code, and/or where a user wants differing levels of constrained access to the code.

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include $4^{th}$ Generation (4G) networks (e.g. Long Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

What is claimed is:

1. A computer-implemented method comprising:
    displaying a representation of a workflow component of a workflow, the representation including a depiction at a first representation level;
    receiving a request to change a representation level for the workflow component from the first representation level to a second representation level;
    responsive to the request, updating the displayed representation of the workflow component, wherein the depiction at the first representation level is replaced by a depiction at the second representation level, wherein one of the depiction at the first representation level or the depiction at the second representation level includes a depiction of a functionality associated with the workflow component and the other of the depiction at the first representation level or the depiction at the second representation level includes a view of programming code for providing the functionality associated with the workflow component;
    receiving a modification to the functionality associated with the workflow component, the modification including a change to the programming code for providing the functionality associated with the workflow component;
    further updating the displayed representation of the workflow component, the further updating including updating the depiction of the functionality associated with the workflow component at the second representation level to reflect the modification;
    determining whether the modification extends beyond a functional bounds of the workflow component; and
    responsive to determining that the modification extends beyond the functional bounds of the workflow component, splitting the workflow component into more than one workflow component.

2. The computer-implemented method of claim 1, the method further comprising:
    receiving input modifying the functionality associated with the workflow component, the input including a selection of a template from amongst a plurality of pre-existing workflow component templates;

modifying the functionality associated with the workflow component based on the received input, the modifying including updating the workflow component based on the selected template; and further updating the displayed representation of the workflow component, the further updating including updating the depiction of the functionality associated with the workflow component at the second representation level to reflect the modified functionality.

3. The computer-implemented method of claim 1, wherein the depiction of the functionality associated with the workflow component includes a visual representation of the functionality.

4. The computer-implemented method of claim 3, wherein the visual representation of the functionality includes at least one of a visual representation of a functional input, a visual representation of a functional output, or a visual representation of a functional constraint.

5. The computer-implemented method of claim 1, wherein determining whether the modification extends beyond the functional bounds of the workflow component includes calculating a level of certainty that no change to the functional bounds of the workflow component is required.

6. The computer-implemented method of claim 5, wherein the level of certainty is based on one or more of a quality indicator for a user associated with the modification or an extent of the modification.

7. The computer-implemented method of claim 1, wherein it is determined that the modification is contained within the functional bounds of the workflow component.

8. The computer-implemented method of claim 1, wherein the programming code for providing the functionality associated with the workflow component is a portion of programming code associated with the workflow, the method further comprising:
receiving a modification to the programming code associated with the workflow;
determining that the modification to the programming code associated with the workflow includes a modification to the programming code for providing the functionality associated with the workflow component; and
further updating the displayed representation of the workflow component, the further updating including updating the depiction of the functionality associated with the workflow component at the second representation level to reflect the modification to the programming code for providing the functionality associated with the workflow component.

9. A computing device comprising:
a processor; and
a memory storing instructions that, when executed by the processor, cause the computing device to:
display a representation of a workflow component of a workflow, the representation including a depiction at a first representation level;
receive a request to change a representation level for the workflow component from the first representation level to a second representation level;
responsive to the request, update the displayed representation of the workflow component, wherein the depiction at the first representation level is replaced by a depiction at the second representation level, wherein one of the depiction at the first representation level or the depiction at the second representation level includes a depiction of a functionality associated with the workflow component and the other of the depiction at the first representation level or the depiction at the second representation level includes a view of programming code for providing the functionality associated with the workflow component;
receive a modification to the functionality associated with the workflow component, the modification including a change to the programming code for providing the functionality associated with the workflow component;
further update the displayed representation of the workflow component, the further updating including updating the depiction of the functionality associated with the workflow component at the second representation level to reflect the modification;
determine whether the modification extends beyond a functional bounds of the workflow component; and
responsive to determining that the modification extends beyond the functional bounds of the workflow component, split the workflow component into more than one workflow component.

10. The computing device of claim 9, wherein the instructions, when executed by the processor, further cause the computing device to:
receive input modifying the functionality associated with the workflow component, the input including a selection of a template from amongst a plurality of pre-existing workflow component templates;
modify the functionality associated with the workflow component based on the received input, the modifying including updating the workflow component based on the selected template; and
further update the displayed representation of the workflow component, the further updating including updating the depiction of the functionality associated with the workflow component at the second representation level to reflect the modified functionality.

11. The computing device of claim 9, wherein the depiction of the functionality associated with the workflow component includes a visual representation of the functionality.

12. The computing device of claim 11, wherein the visual representation of the functionality includes at least one of a visual representation of a functional input, a visual representation of a functional output, or a visual representation of a functional constraint.

13. The computing device of claim 9, wherein determining whether the modification extends beyond the functional bounds of the workflow component includes calculating a level of certainty that no change to the functional bounds of the workflow component is required.

14. The computing device of claim 13, wherein the level of certainty is based on one or more of a quality indicator for a user associated with the modification or an extent of the modification.

15. The computing device of claim 9, wherein it is determined that the modification is contained within the functional bounds of the workflow component.

16. The computing device of claim 9, wherein the programming code for providing the functionality associated with the workflow component is a portion of programming code associated with the workflow, and wherein the instructions, when executed by the processor, further cause the computing device to:
receive a modification to the programming code associated with the workflow;
determine that the modification to the programming code associated with the workflow includes a modification to the programming code for providing the functionality associated with the workflow component; and further update the displayed representation of the workflow component, the further updating including updating the depiction of the functionality associated with the workflow component at the second representation level to reflect the modification to the programming code for providing the functionality associated with the workflow component.

17. A non-transitory computer-readable storage medium storing instructions, that when executed by a processor of a computing device, cause the computing device to:
   display a representation of a workflow component of a workflow, the representation including a depiction at a first representation level;
   receive a request to change a representation level for the workflow component from the first representation level to a second representation level;
   responsive to the request, update the displayed representation of the workflow component, wherein the depiction at the first representation level is replaced by a depiction at the second representation level, wherein one of the depiction at the first representation level or the depiction at the second representation level includes a depiction of a functionality associated with the workflow component and the other of the depiction at the first representation level or the depiction at the second representation level includes a view of programming code for providing the functionality associated with the workflow component;
   receive a modification to the functionality associated with the workflow component, the modification including a change to the programming code for providing the functionality associated with the workflow component;
   further update the displayed representation of the workflow component, the further updating including updating the depiction of the functionality associated with the workflow component at the second representation level to reflect the modification;
   determine whether the modification extends beyond a functional bounds of the workflow component; and
   responsive to determining that the modification extends beyond the functional bounds of the workflow component, split the workflow component into more than one workflow component.

18. The non-transitory computer-readable storage medium of claim 17, wherein the instructions, when executed by the processor, further cause the computing device to:
   receive input modifying the functionality associated with the workflow component, the input including a selection of a template from amongst a plurality of pre-existing workflow component templates;
   modify the functionality associated with the workflow component based on the received input, the modifying including updating the workflow component based on the selected template; and
   further update the displayed representation of the workflow component, the further updating including updating the depiction of the functionality associated with the workflow component at the second representation level to reflect the modified functionality.

19. The non-transitory computer-readable storage medium of claim 17, wherein the depiction of the functionality associated with the workflow component includes a visual representation of the functionality.

20. The non-transitory computer-readable storage medium of claim 19, wherein the visual representation of the functionality includes at least one of a visual representation of a functional input, a visual representation of a functional output, or a visual representation of a functional constraint.

21. The non-transitory computer-readable storage medium of claim 17, wherein determining whether the modification extends beyond the functional bounds of the workflow component includes calculating a level of certainty that no change to the functional bounds of the workflow component is required.

22. The non-transitory computer-readable storage medium of claim 21, wherein the level of certainty is based on one or more of a quality indicator for a user associated with the modification or an extent of the modification.

23. The non-transitory computer-readable storage medium of claim 17, wherein it is determined that the modification is contained within the functional bounds of the workflow component.

* * * * *